Patented Aug. 9, 1949

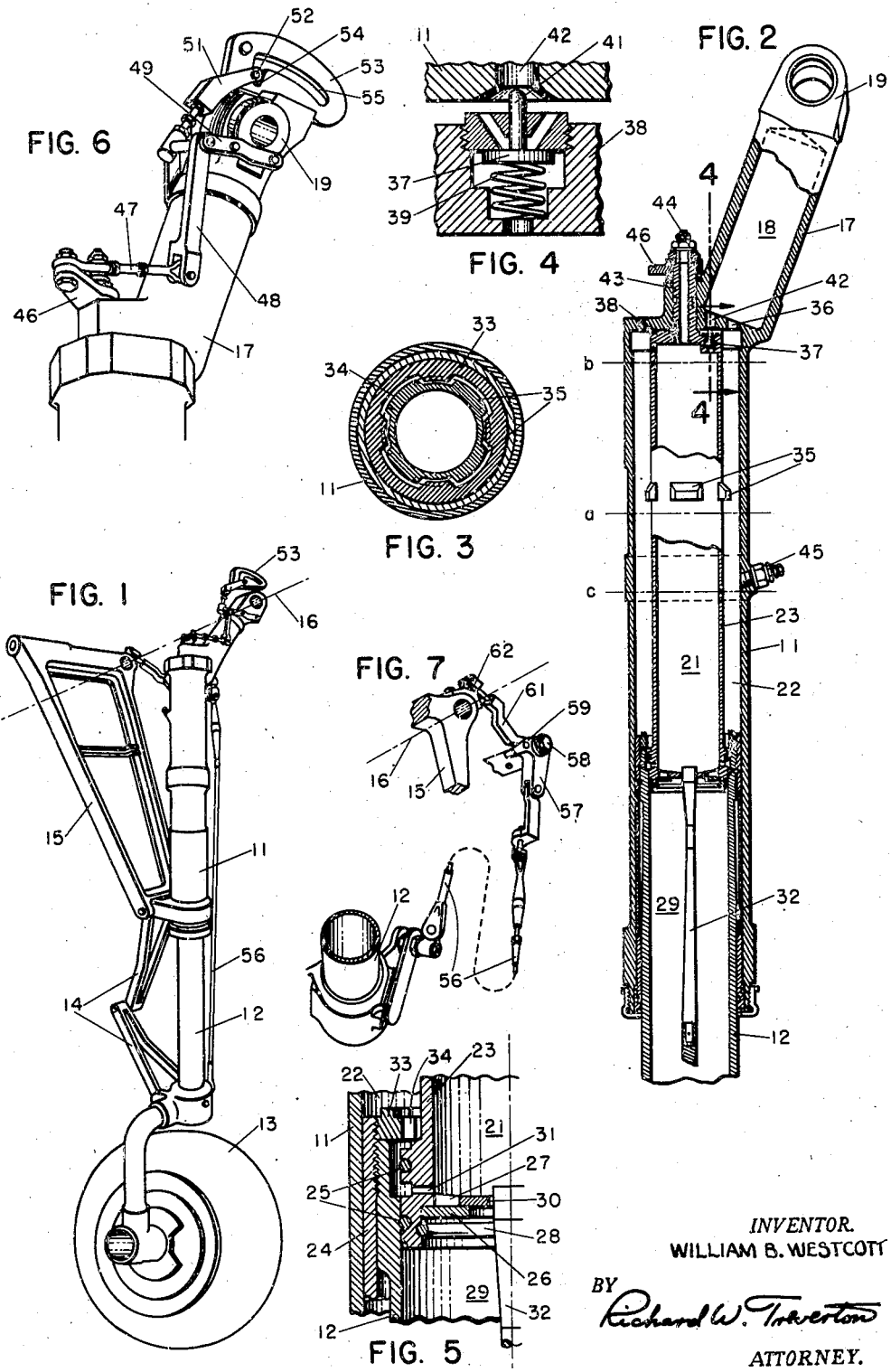

2,478,729

UNITED STATES PATENT OFFICE 2,478,729

RETRACTABLE LANDING GEAR

William B. Westcott, Jr., Kingston, N. Y., assignor to Curtiss-Wright Corporation, a corporation of Delaware Application January 8, 1948, Serial No. 1,134

11 Claims. (Cl. 244—102)

This invention relates to rectactable landing gear for aircraft and particularly to retractable gear having an extensible shock strut.

In gear of this type the shock strut may resiliently contract and extend to absorb shocks incidental to the aircraft landing or moving over an uneven ground surface. While the aircraft is in flight the shock strut and the landing wheel carried by it are usually retracted into a well in the aircraft fuselage or wing. Such a well imposes restrictions on the location of structural members, fuel tanks and other components of the aircraft and, accordingly, is usually desired to be of the minimum permissible size. One factor determining the size is, of course, the length of the shock strut, which must be sufficient, when the landing gear is projected, to support the aircraft in the desired attitude on the ground with the necessary ground clearance.

An objective of the present invention is to provide means enabling the shock strut to be contracted to fit into a well of small dimensions when the landing gear is retracted, while serving to restrain the shock strut against such contraction when the gear is projected for supporting the aircraft upon the ground.

A further objective is to provide means of the character indicated in the preceding paragraph which will function automatically upon projection and retraction of the landing gear.

A still further objective is to provide such means which will be operated automatically by the same source of power which serves to effect the landing gear retraction or projection.

The present invention meets the foregoing objectives by providing a landing gear having a shock strut whose contraction is limited by stop means when the landing gear is in projected position, the stop means being moved automatically to a position wherein they are ineffective as the landing gear is retracted, thereby permitting complete contraction of the strut. Means are provided whereby such complete contraction is accomplished by retractive motion of landing gear mechanism, eliminating need of additional power operating means and control means.

The strut, preferably of the air-hydraulic type, comprises telescoping sections which are extended by the action of a compressed elastic medium. In order to permit complete contraction of the strut from the position thereof in which it supports the aircraft upon the ground, means are provided to release the compression of the elastic medium prior to such complete contraction. In the case of an air-hydraulic strut the venting means include a normally closed vent valve which is opened at the same time and by the same means by which the stop means are rendered ineffective, and the venting means further include a relatively low pressure chamber into which the vented air and hydraulic fluid may pass from the working chamber as the strut is completely contracted.

The foregoing and other objects and advantages of the present invention will become apparent from the following description of the typical embodiment of the invention shown in the accompanying drawings, wherein:

Figure 1 is a perspective of a landing gear embodying the invention, with the gear in projected or landing position and its shock strut fully extended;

Figure 2 is a longitudinal sectional view through the shock strut;

Figure 3 is a cross-section through the strut at the stop means when the latter are disengaged;

Figure 4 is a detail sectional view taken along line 4—4 of Figure 2 and illustrating the vent valve at the upper end of the shock strut;

Figure 5 is a detail sectional view showing a fluid seal and valve between two chambers in the strut;

Figure 6 is a perspective view showing linkage at the upper end of the strut for operating the stop means and the vent valve; and, Figure 7 is a detail view of the means for contracting the strut upon retraction of the landing gear.

As shown in Figure 1 the landing gear may comprise a shock strut having telescoping upper and lower sections 11 and 12, a landing wheel 13 carried by lower strut section 12, a scissors linkage 14 pivotally connecting section 11 with section 12 to prevent the latter from turning about its own longitudinal axis, and a knee brace 15. The knee brace and strut section 11 are pivoted to fixed parts of the aircraft (not shown) about an axis indicated at 16 which extends generally in a direction longitudinal of the aircraft. With this arrangement the landing gear may be pivoted about axis 16, to the left as viewed in Figure 1 from its upright projected position to a substantially horizontal position in which it will be retracted within a well in the aircraft fuselage or wing. Any suitable means, not shown, may be employed to move the gear between its extended and retracted positions.

At the upper portion of strut section 11 is a tubular portion 17 containing a chamber 18 and a bearing 19 which supports the strut for pivotal motion about axis 16. Dividing the interior of strut section 11 into inner and outer chambers 21 and 22, respectively, is a rotatable tubular element 23 which constitutes the plunger or piston of the contractable strut while lower section 12 constitutes the working cylinder thereof. As is best shown in Figure 5 a packing sleeve 24, secured to the upper end of section 12, is in sliding engagement with the inner surface of section 11, i. e. the outer wall of chamber 22, while the bore of section 12 is slidably engaged by packing rings 25 carried by the end of piston 23. A ring shaped check valve 26 is adapted to close ports 27 in the bottom wall of piston 23. These ports, opened when valve 26 drops to open position against a valve retainer ring 28, provide for free passage of fluid from chamber 21 to the cylinder chamber, designated 29, within the strut section 12. Other ports, designated 31, provide for fluid passage between chambers 22 and 21 when, but only when, the shock strut is in its fully extended position shown in Figures 2 and 5. In other positions the wall of section 12 closes ports 31.

Secured at its lower end to the bottom of strut section 12 is a metering pin 32, which varies in diameter at different points along its length. The pin extends through and serves to control the effective area of a metering orifice 30 in the bottom wall of piston 23, this orifice providing restricted fluid communication between chambers 21 and 29. At the extreme upper end of strut section 12 is a ring 33 whose inner periphery has recesses 34 adapted to pass projections 35 formed on member 23, when the projections are aligned with the recesses. The projections are shown in this passing relation in full lines in Figure 3. When the member 23 is rotated to a position wherein projections 35 are not aligned with recesses 34, the projections and ring 33 constitute stop means which abut to limit the contraction of the strut.

As will be seen in Figure 2 the chamber 18 is in communication at all times through a port 36 with chamber 22, and the two chambers 18 and 22 may together be considered to constitute a single pressure relief chamber. Chamber 21 is in communication with chambers 18 and 22 (except via ports 31) only when a vent valve 37 is open. As best shown in Figure 4 this valve is arranged in a small valve chamber in the upper wall 38 of tubular member 23 and is normally held closed by a spring 39. The vent valve has a stem 41 which extends into an opening 42 in the upper wall of member 11 when the member 23 is rotated to the position in which the stop means 33, 35 are engageable. When member 23 is rotated to align stops 35 with recesses 34 the valve stem is cammed downwardly by the flaring bottom wall of opening 42, thereby opening the vent valve.

For rotatably supporting the tubular member 23 the latter has a hollow spindle 43 extending through the upper wall of strut section 11. A screw threaded valve fitting 44 on the upper end of the spindle provides a means of entering hydraulic fluid and compressed air into chamber 21. A similar screw threaded valve fitting 45 on the side wall of section 11 enables hydraulic fluid and compressed air to be entered into chamber 22.

Secured to spindle 43 is a lever arm 46 which is pivotally connected by a link 47 to an arm 48 of a bell crank lever. This bellcrank lever is pivoted at 49 to bracket means carried by the part 17, and its other arm, designated 51, has a follower 52 engaged in the cam slot of a member 53 that is mounted on a fixed part of the aircraft. The cam slot has a portion 54 extending away from the pivot axis 16 and at its outer end merges into a curved portion 55 of the slot whose axis of curvature is substantially coincident with axis 16.

The operation of the linkage above described is as follows: Upon initial retractive movement of the landing gear about axis 16, clockwise in Figures 1 and 6, the follower 52 being confined to portion 54 of the cam slot will move outwardly therein, away from pivot axis 16. This will cause the bellcrank 48 to move counter-clockwise relative to the strut, turning lever 46 clockwise in Figure 6. This motion will continue until follower 52 passes into curved part 55 of the cam slot after which the bellcrank and lever 46 will have no further movement relative to the strut. During their movement, however, the tubular part 23 will be rotated sufficiently to align stops 35 with recesses 34 and to open the vent valve 37. Upon projection of the landing gear from retracted position the reverse of the operation just described will take place.

The means for contracting strut 11, 12 upon retraction of the landing gear include a flexible cable or link 56 anchored to the lower end of strut section 12. Element 56 is connected at its upper end to one arm of a bellcrank lever 57 which is pivoted at 58 to a fixed part of the aircraft. The other arm of the bellcrank is pivoted at 59 to a link 61 that is pivoted at 62 to an upper part of knee brace 15. As the shock strut and knee brace pivot about axis 16 in moving from projected to retracted position the bellcrank 57 will be swung counter-clockwise, as it appears in Figure 7, by the action of link 61, with the result that flexible link 56 will be moved, in a direction substantially longitudinal of the shock strut, toward axis 16. The parts of the linkage just described are preferably so proportioned that as the landing gear is fully retracted the strut 11, 12 will be fully contracted, with ring 33 on the lower strut section being brought near to or into abutment with the upper wall of strut section 11.

When the landing gear is projected and the shock strut is supporting its full share of the ground weight of the aircraft, the piston member will be telescoped well into cylinder chamber 29 (strut section 12 being telescoped partially into section 11) so that the top of ring 33 will be only slightly below stops 35, about at the level indicated by line $a$ in Figure 2. In this position of the parts chamber 29 will be completely filled and chamber 21 almost completely filled with hydraulic fluid, the fluid level being approximately as indicated by $b$ in Figure 2. Above level $b$ chamber 21 contains compressed air substantially under the pressure needed to support the airplane load on the shock strut since the air pressure in chambers 18 and 22 is relatively low in this position of the parts and contributes relatively little to holding the strut against further contraction. If the airplane moves over an uneven ground surface, or for other reasons the load on the strut is increased or decreased, the strut may contract or extend, with resultant raising or lowering of levels $a$ and $b$ relative to strut section 11, and increase or decrease of the pressure in chambers 21 and 29. The action of ring check valve 26 is to permit fluid to readily pass from chamber 21 to chamber 29, providing for rapid extension of the strut, and to close upon reverse flow of fluid thus snubbing contraction of the strut. During such contraction fluid can pass from chamber 29 to chamber 21 only through orifice 33 at a rate determined by the metering pin 32. As the aircraft becomes airbourne the forces of gravity and air pressures within the strut will extend the latter to its limit position shown in Figures 1 and 2. In this position chambers 21 and 22 will be in open communication via port 31, and the levels of hydraulic fluid in both chambers will be as approximately indicated by line c in Figure 2. The several chambers are so proportioned that just prior to opening of ports 31 the pressure in chambers 21 and 29 will substantially equal that in chambers 18 and 22, and, of course, upon opening of the ports 31 any difference in these pressures will quickly disappear.

Upon retraction of the landing gear, which will normally occur only after the complete extension of the shock strut, the vent valve 37 will open and thereafter the strut will be completely contracted as has been described hereinbefore. During this action chamber 29 will be fully contracted with the result that first air and then hydraulic fluid will pass from chamber 21 via the vent valve into chambers 18 and 22. The volumes of the several chambers are such that a considerable air space will remain above the liquid level in chamber 18 when the strut is fully contracted, and the result of this is that a relatively small pressure is built up in the system and only a relatively small force is required for strut compression. It will be readily understood that the pressure values may vary widely with different proportions of the parts, this being a matter within the selection of the designer.

As the landing gear is extended from its retracted position the strut will extend in length by gravity and by contained fluid pressure, with full extension of the strut occurring prior to the gear reaching its limit of projection, i. e. of movement about axis 16 to an upright position. The ports 31 accordingly remain open for some time before vent valve 37 closes, with the result that the pressures and liquid levels in chambers 21 and 22 will be substantially equalized. From the foregoing it will be seen that the proportions of the parts are advantageously such that upon landing gear retraction the vent valve will open before the strut is contracted, and that upon gear extension the strut will fully extend before the vent valve is closed.

Upon the landing the strut will be contracted by the weight of the airplane, with resulting passage of fluid from chamber 29 into chamber 21 and compression of air above the liquid in chamber 21 (and to a much lesser extent compression of air in chambers 18 and 22) until such pressure becomes sufficient to resist the load urging strut contraction.

It will now be seen that the invention provides a means whereby the shock strut is substantially shortened, so as to occupy considerably less space, when the gear is retracted. Excessive forces are not required to effect such shortening because of the vent valve means which automatically open as the gear is retracted. The stop means 34, 35 preclude the possibility of the strut contracting excessively, to reduce the ground clearance below a safe minimum, either by reason of an abnormally hard landing or of insufficient air pressure in the strut.

The landing gear shown and described herein represents a preferred embodiment of the inventive principles involved. However these principles may be embodied in various other physical arrangements which will be readily apparent to those skilled in the art without departing from the spirit of the invention or from the scope of the appended claims.

I claim:

1. A retractable aircraft landing gear comprising: a strut adapted to contain an elastic fluid and having an upper section connected to the aircraft body for movement of the strut between projected and retracted positions, the interior of said upper section containing a pressure relief chamber for said fluid, a piston rotatably mounted in said upper section and containing a pressure chamber for said fluid, a lower strut section telescoping into the upper section and containing a cylinder chamber receiving said piston, the piston having a passage communicating with cylinder chamber and the pressure chamber, said piston also having a port communicating with the lower portions of the pressure and relief chambers when the upper and lower strut sections are substantially fully extended, the port being closed by the lower strut section in other positions of the strut sections, valve means arranged to be open in one position of rotation of the piston to open fluid communication between the upper portion of the pressure chamber and the relief chamber, said valve means being arranged to be closed in another position of rotation of the piston, cooperating stop means on the piston and lower strut section, said stop means being engageable when the piston is in said other position to limit contraction of the strut, said stop means being non-engageable when the piston is in said one position to permit complete contraction of the strut; means connecting the aircraft body with the piston for rotating the latter to said one position thereof as the strut is moved from the projected position thereof and for rotating the piston to said other position as the strut is moved into its projected position; and means connecting the aircraft body with the lower strut section for completely contracting the strut as it is retracted and permitting the strut to extend as it is moved from retracted position.

2. A retractable aircraft landing gear comprising: a strut adapted to contain an elastic fluid and having an upper section connected to the aircraft body for movement of the strut between projected and retracted positions, the interior of said upper section containing a pressure relief chamber for said fluid, a piston rotatably mounted in said upper section and containing a pressure chamber for said fluid, a lower strut section telescoping into the upper section and containing a cylinder chamber receiving said piston, the piston having a passage communicating with cylinder chamber and the pressure chamber, said piston also having a port communicating with the lower portions of the pressure and relief chambers when the upper and lower strut sections are substantially fully extended, the port being closed by the lower strut section in other positions of the strut sections, valve means arranged to be open in one position of rotation of the piston to open fluid communication between the upper portion of the pressure chamber and the relief chamber, said valve means being arranged to be closed in another position of rotation of the piston, means connecting the aircraft body with the piston for rotating the latter to said one position thereof as the strut is moved from the projected position thereof and for rotating the piston to said other position as the strut is moved into its projected position; and means connecting the aircraft body with the lower strut section for completely contracting the strut as it is retracted and permitting the strut to extend as it is moved from retracted position.

3. A retractable aircraft landing gear comprising: a strut adapted to contain an elastic fluid and having an upper section connected to the aircraft body for movement of the strut between projected and retracted positions, the interior of said upper section containing a pressure relief chamber for said fluid, a piston mounted in said upper section and containing a pressure chamber for said fluid, a lower strut section telescoping into the upper section and containing a cylinder chamber receiving said piston, the piston having a passage communicating with cylinder chamber and the pressure chamber, said piston also having a port communicating with the lower portions of the pressure and relief chambers when the upper and lower strut sections are substantially fully extended, the port being closed by the lower strut section in other positions of the strut sections, valve means adapted when open to provide fluid communication between the upper portion of the pressure chamber and the relief chamber, stop means to limit contraction of the strut short of complete contraction thereof; means connected with the aircraft body for rendering said stop means ineffective and for opening said valve means as the strut is moved from the projected position thereof; and means connecting the aircraft body with the lower strut section for completely contracting the strut as it is retracted.

4. A retractable aircraft landing gear comprising: a strut adapted to contain an elastic fluid and having an upper section connected to the aircraft body for movement of the strut between projected and retracted positions, the interior of said upper section containing a pressure relief chamber for said fluid, a piston mounted in said upper section and containing a pressure chamber for said fluid, a lower strut section telescoping into the upper section and containing a cylinder chamber receiving said piston, the piston having a passage communicating with cylinder chamber and the pressure chamber, said piston also having a port communicating with the lower portions of the pressure and relief chambers when the upper and lower strut sections are substantially fully extended, the port being closed by the lower strut section in other positions of the strut sections, valve means adapted when open to provide fluid communication between the upper portion of the pressure chamber and the relief chamber; means connected with the aircraft body for opening the valve means as the strut is moved from the projected position thereof and providing for closing of the valve means as the strut is moved into its projected position; and means connecting the aircraft body with the lower strut section for contracting the strut, beyond the position thereof in which it supports the aircraft on the ground, as it is retracted and permitting the strut to extend as it is moved from retracted position.

5. A retractable aircraft landing gear comprising: an extensible and contractable strut having an upper part connected to the aircraft body for movement of the strut between projected and retracted positions, a piston rotatably mounted in said upper section and a lower strut section telescoping into the upper section and containing a cylinder chamber receiving said piston, said chamber being adapted to contain a fluid under sufficient pressure to support the strut in an intermediate position of extension under ground loads, valve means arranged to be open in one position of rotation of the piston to vent the cylinder chamber, said valve means being arranged to be closed in another position of rotation of the piston to maintain fluid under pressure in the cylinder chamber, cooperating stop means on the piston and lower strut section, said stop means being engageable when the piston is in said other position to limit contraction of the strut, said stop means being non-engageable when the piston is in said one position to permit complete contraction of the strut; means connecting the aircraft body with the piston for rotating the latter to said one position thereof as the strut is moved from the projected position thereof and for rotating the piston to said other position as the strut is moved from the projected position thereof and for rotating the piston to said other position as the strut is moved into its projected position; and means connecting the aircraft body with the lower strut section for contracting the strut as it is retracted and permitting the strut to extend as it is moved from retracted position.

6. A retractable aircraft landing gear comprising: an extensible and contractable strut mounted for movement between retracted and projected positions relative to the aircraft, said strut having a working chamber adapted to contain an elastic fluid under sufficient pressure to support the strut in an intermediate position of extension under ground loads, a relief chamber and valve means adapted when open to place the relief chamber in fluid communication with the working chamber, movable stop means operable in the effective position thereof to limit contraction of the strut from said intermediate position, means for opening the valve means and rendering said stop means ineffective upon retractive movement of the strut from the projected position thereof, and means operable by and upon retraction of the strut for contracting the latter beyond said limit position thereof.

7. A retractable aircraft landing gear comprising: an extensible and contractable strut mounted for movement between retracted and projected positions relative to the aircraft, said strut containing an elastic medium for supporting the strut in an intermediate position of extension under ground loads, release means for releasing said elastic medium, movable stop means operable in the effective position thereof to limit contraction of the strut from said intermediate position, means for operating said release means and rendering said stop means ineffective upon retractive movement of the strut from the projected position thereof, and means operable by and upon retraction of the strut for contracting the latter beyond said limit position thereof.

8. A retractable aircraft landing gear comprising: an extensible and contractable strut mounted for movement between retracted and projected positions relative to the aircraft, said strut having a working chamber adapted to contain an elastic fluid under sufficient pressure to support the strut in an intermediate position of extension under ground loads, valve means adapted when open to vent the working chamber to provide for escape of fluid therefrom, movable stop means operable in the effective position thereof to limit contraction of the strut from said intermediate position, means for opening the valve means and rendering said stop means ineffective upon retractive movement of the strut from the projected position thereof, and means operable by and upon retraction of the strut for contracting the latter beyond said limit position thereof.

9. A retractable aircraft landing gear comprising: an extensible and contractable strut mounted for movement between retracted and projected positions relative to the aircraft, said strut containing an elastic medium for supporting the strut in an intermediate position of extension under ground loads, movable stop means operable in the effective position thereof to limit contraction of the strut from said intermediate position, means for rendering said stop means ineffective upon retractive movement of the strut from the projected position thereof, and means operable by and upon retraction of the strut for contracting the latter beyond said limit position thereof.

10. A retractable aircraft landing gear comprising: an oleo strut having an upper section connected to the aircraft body for movement of the strut between projected and retracted positions, said upper section containing a pressure relief chamber and a piston which contains a pressure chamber, a lower strut section telescoping into the upper section and containing a cylinder chamber receiving said piston, an opening providing restricted fluid communication between the cylinder chamber and the pressure chamber, a first passage for connecting the lower part of the pressure chamber with the pressure relief chamber, valve means for said first passage arranged to open only upon complete extension of the strut resulting from removal of ground loads therefrom, a second passage for connecting the upper portion of the pressure chamber with the pressure relief chamber, and valve means for said second passage arranged to open and close by and upon movement of the strut toward its retracted and projected positions, respectively.

11. A retractable aircraft landing gear comprising: an extensible and contractable shock strut for movement between retracted and projected positions relative to the aircraft, said strut having a working chamber adapted when the strut is in its normal load supporting condition to contain a compressed gas in the upper portion thereof and a liquid in the lower portion thereof, a relief chamber and first valve means adapted when open to place the relief chamber in fluid communication with said upper portion of the working chamber, second valve means adapted when open to place the relief chamber in fluid communication with said lower portion of the working chamber, means for opening the first valve means upon retractive movement of the strut from the projected position thereof, and means for opening the second valve means upon the strut reaching the fully extended condition thereof resulting from removal of ground loads from the strut.

WILLIAM B. WESTCOTT, JR.

REFERENCES CITED

The following references are of record in the file of this patent:

UNITED STATES PATENTS

| Number | Name | Date |
| --- | --- | --- |
| 2,390,661 | Parilla | Dec. 11, 1945 |